United States Patent
Kobayashi et al.

(10) Patent No.: US 12,202,929 B2
(45) Date of Patent: Jan. 21, 2025

(54) CURABLE COMPOSITION AND FIBER REINFORCED COMPOSITE MATERIAL

(71) Applicant: DIC Corporation, Tokyo (JP)

(72) Inventors: Atsuko Kobayashi, Ichihara (JP); Shigeki Matsui, Ichihara (JP); Makoto Kimura, Ichihara (JP)

(73) Assignee: DIC Corporation, Tokyo (JP)

(*) Notice: Subject to any disclaimer, the term of this patent is extended or adjusted under 35 U.S.C. 154(b) by 114 days.

(21) Appl. No.: 18/096,725

(22) Filed: Jan. 13, 2023

(65) Prior Publication Data

US 2023/0167228 A1    Jun. 1, 2023

Related U.S. Application Data

(63) Continuation of application No. 16/970,765, filed as application No. PCT/JP2019/004795 on Feb. 12, 2019, now abandoned.

(30) Foreign Application Priority Data

Feb. 20, 2018 (JP) ................................ 2018-027835

(51) Int. Cl.
| | |
|---|---|
| *C08G 18/58* | (2006.01) |
| *C08G 18/12* | (2006.01) |
| *C08G 18/42* | (2006.01) |
| *C08G 18/75* | (2006.01) |
| *C08G 59/24* | (2006.01) |
| *C08G 59/28* | (2006.01) |
| *C08G 59/42* | (2006.01) |
| *C08J 5/04* | (2006.01) |
| *C08J 5/24* | (2006.01) |
| *C08L 63/00* | (2006.01) |

(52) U.S. Cl.
CPC ............. *C08G 18/58* (2013.01); *C08G 18/12* (2013.01); *C08G 18/4238* (2013.01); *C08G 18/755* (2013.01); *C08G 59/245* (2013.01); *C08G 59/28* (2013.01); *C08G 59/4223* (2013.01); *C08J 5/042* (2013.01); *C08J 5/243* (2021.05); *C08J 5/249* (2021.05); *C08L 63/00* (2013.01); *C08J 2363/02* (2013.01); *C08L 2203/30* (2013.01); *C08L 2312/00* (2013.01)

(58) Field of Classification Search
CPC .... C08G 18/58; C08G 18/12; C08G 18/4238; C08G 18/755; C08G 59/245; C08G 59/28; C08G 59/4223; C08J 5/249; C08J 5/243; C08J 5/042; C08J 2363/02; C08L 63/00; C08L 2203/30; C08L 2312/00
USPC ......................................................... 525/523
See application file for complete search history.

(56) References Cited

U.S. PATENT DOCUMENTS

| | | | |
|---|---|---|---|
| 4,749,743 | A | 6/1988 | Ambrose et al. |
| 2017/0240687 | A1 | 8/2017 | Frick et al. |

FOREIGN PATENT DOCUMENTS

| | | |
|---|---|---|
| JP | S58-191723 A | 11/1983 |
| JP | 2010-163573 A | 7/2010 |
| JP | 2011-105916 A | 6/2011 |
| JP | 2015-81329 A | 4/2015 |
| JP | 2015-086374 A | 5/2015 |
| WO | 2001/040396 A2 | 6/2001 |
| WO | 2009/051209 A1 | 4/2009 |
| WO | 2016/059043 A1 | 4/2016 |

OTHER PUBLICATIONS

Ohori et al., JP 2011-105916 A machine translation in English, Jun. 2, 2011. (Year: 2011).*
Suzuki, JP 2015-086374 A machine translation in English, May 7, 2015. (Year: 2015).*
International Search Report mailed May 7, 2019, issued for PCT/JP2019/004795.
Office Action mailed Mar. 25, 2022, issued for CN201980014172.5.

* cited by examiner

*Primary Examiner* — David T Karst
(74) *Attorney, Agent, or Firm* — Locke Lord LLP; James E. Armstrong, IV; Nicholas J. DiCeglie, Jr.

(57) ABSTRACT

The present invention provides a curable composition comprising a urethane-modified epoxy resin (A) as an essential component of a main material, and an acid anhydride (B) as an essential component of a curing agent, wherein the urethane-modified epoxy resin (A) is a reaction product of a polyisocyanate compound (a1), a polyester polyol (a2), and a hydroxyl group-containing epoxy resin (a3) as essential reaction raw materials. The curable composition of the invention is advantageous in that a cured product having excellent fracture toughness and excellent tensile strength can be formed from the composition.

10 Claims, No Drawings

CURABLE COMPOSITION AND FIBER REINFORCED COMPOSITE MATERIAL

CROSS REFERENCE TO RELATED APPLICATIONS

This Application is a Continuation of U.S. patent application Ser. No. 16/970,765, filed on Aug. 18, 2020, which application is a U.S. 371 National Phase Patent Application of International PCT Patent Application No. PCT/JP2019/004795, filed on Feb. 12, 2019, which application claims priority to Japanese Patent Application No. 2018-027835, filed on Feb. 20, 2018. The entire contents of these applications are incorporated herein by reference in their entirety.

TECHNICAL FIELD

The present invention relates to a curable composition advantageous in that a cured product obtained therefrom has excellent fracture toughness and excellent tensile strength and a cured product thereof, a fiber-reinforced composite material, a fiber-reinforced resin molded article, and a method for producing a fiber-reinforced resin molded article.

BACKGROUND ART

A fiber-reinforced resin molded article which is reinforced with a reinforcing fiber has drawn attention due to advantageous features of being lightweight and having excellent mechanical strength, and the use of the fiber-reinforced resin molded article is expanding in the application of various structures including housings and various members for automobiles, aircrafts, vessels, and the like. The fiber-reinforced resin molded article can be produced by molding a fiber-reinforced composite material by a molding method, such as a filament winding method, a press molding method, a hand lay-up method, a pultrusion method, or an RTM method.

The fiber-reinforced composite material is obtained by impregnating a reinforcing fiber with a resin. The resin used in the fiber-reinforced composite material is required to have excellent stability at ordinary room temperature and to provide a cured product having excellent durability and strength, and therefore a thermosetting resin is generally used. Further, as mentioned above, the resin is used in the fiber-reinforced composite material in such a way that a reinforcing fiber is impregnated with the resin, and hence the resin having a viscosity as low as possible is advantageous to the impregnation step.

Further, the properties required for the resin vary depending on the use of the fiber-reinforced resin molded article. For example, when used in structural parts for an engine and the like or electric wire core materials, the fiber-reinforced resin molded article must be durable in a severe use environment for a long term, and therefore demands a resin such that a cured product thereof has excellent heat resistance and excellent mechanical strength. Meanwhile, when used in a housing and members for a vessel, the fiber-reinforced resin molded article must be durable in the long-term use in water, and therefore demands a resin such that a cured product thereof has excellent low water-absorption properties as well as excellent mechanical strength.

As a resin composition for a fiber-reinforced composite material, for example, an epoxy resin composition containing a main material containing a bisphenol epoxy resin and a curing agent containing an acid anhydride has been widely known (see, for example, PTL 1). Such an epoxy resin composition has features that it has high impregnation properties for a reinforcing fiber, and that a cured product obtained from the composition has excellent heat resistance and the like; however, the epoxy resin composition cannot achieve satisfactory mechanical strength evaluated by a fracture toughness test and a tensile strength test.

CITATION LIST

Patent Literature

PTL 1: JP-A-2010-163573

SUMMARY OF INVENTION

Technical Problem

Accordingly, an object to be achieved by the present invention is to provide a curable composition advantageous in that a cured product obtained therefrom has excellent fracture toughness and excellent tensile strength and a cured product thereof, a fiber-reinforced composite material, a fiber-reinforced resin molded article, and a method for producing a fiber-reinforced resin molded article.

Solution to Problem

The present inventors have conducted extensive and intensive studies with a view toward solving the above-mentioned problems. As a result, it has been found that the problems can be solved by using, as an epoxy resin component, a urethane-modified epoxy resin obtained from a polyisocyanate compound, a polyester polyol, and a hydroxyl group-containing epoxy resin (a3) as essential reaction raw materials, and using an acid anhydride as a curing agent, and the present invention has been completed.

Specifically, the present invention provides a curable composition containing a urethane-modified epoxy resin (A) as an essential component of a main material, and an acid anhydride (B) as an essential component of a curing agent, wherein the urethane-modified epoxy resin (A) is a reaction product of a polyisocyanate compound (a1), a polyester polyol (a2), and a hydroxyl group-containing epoxy resin (a3) as essential reaction raw materials.

The present invention further provides a cured product of the above-mentioned curable composition, a fiber-reinforced composite material using the curable composition, a fiber-reinforced resin molded article, and a method for producing a fiber-reinforced resin molded article.

Advantageous Effects of Invention

In the present invention, there can be provided a curable composition advantageous in that a cured product obtained therefrom has excellent fracture toughness and excellent tensile strength and a cured product thereof, a fiber-reinforced composite material, a fiber-reinforced resin molded article, and a method for producing a fiber-reinforced resin molded article.

DESCRIPTION OF EMBODIMENTS

The curable composition of the present invention is a curable composition which contains a urethane-modified epoxy resin (A) as an essential component of a main material, and an acid anhydride (B) as an essential component of a curing agent, wherein the urethane-modified epoxy resin (A) is a reaction product of a polyisocyanate compound (a1), a polyester polyol (a2), and a hydroxyl group-containing epoxy resin (a3) as essential reaction raw materials.

With respect to the polyisocyanate compound (a1) which is the reaction raw material of the urethane-modified epoxy resin (A), examples of the compounds include aliphatic diisocyanate compounds, such as butane diisocyanate, hexamethylene diisocyanate, 2,2,4-trimethylhexamethylene diisocyanate, and 2,4,4-trimethylhexamethylene diisocyanate; alicyclic diisocyanate compounds, such as norbornane diisocyanate, isophorone diisocyanate, hydrogenated xylylene diisocyanate, and hydrogenated diphenylmethane diisocyanate; aromatic diisocyanate compounds, such as tolylene diisocyanate, xylylene diisocyanate, tetramethylxylylene diisocyanate, diphenylmethane diisocyanate, and 1,5-naphthalene diisocyanate; a polymethylene polyphenyl polyisocyanate having a repeating structure represented by the structural formula (1) below; and an isocyanurate modification product, a biuret modification product, and an allophanate modification product of the above compounds. These may be used individually or in combination.

[Chem. 1]

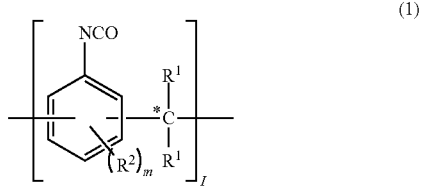

(1)

In the formula, each $R^1$ is independently a hydrogen atom or a hydrocarbon group having 1 to 6 carbon atoms, each $R^2$ is independently an alkyl group having 1 to 4 carbon atoms or a bonding site for linking the structure portion represented by the structural formula (1) through a methylene group indicated by symbol *, m is 0 or an integer of 1 to 3, and 1 is an integer of 1 or more.

With respect to the polyisocyanate compound (a1), in view of obtaining a curable composition advantageous not only in that a cured product obtained therefrom has high fracture toughness and high tensile strength, but also in that the composition exhibits excellent impregnation properties for a reinforcing fiber, preferred are diisocyanate compounds, and more preferred are diisocyanate compounds having a cyclic structure in the molecular structure thereof, that is, alicyclic diisocyanates or aromatic diisocyanates are more preferred. Further, those having an isocyanate group content of 35% by mass or more are especially preferred. When two or more types of the polyisocyanate compounds (a1) are used in combination, it is preferred that a diisocyanate compound constitutes 80% by mass or more of the polyisocyanate compounds (a1), and it is more preferred that an alicyclic diisocyanate or an aromatic diisocyanate constitutes 80% by mass or more of the polyisocyanate compounds (a1).

With respect to the polyester polyol (a2), for example, there can be mentioned a polyester polyol obtained from a polybasic acid raw material and a polyol raw material as reaction raw materials, and a lactone compound may be contained as part of the reaction raw materials. Specific examples of the polybasic acid raw materials include aliphatic dicarboxylic acid compounds, such as oxalic acid, malonic acid, succinic acid, maleic acid, fumaric acid, glutaric acid, adipic acid, pimelic acid, suberic acid, azelaic acid, and sebacic acid, and derivatives thereof, such as acid anhydrides, acid halides, and alkyl esters of these compounds;
  alicyclic dicarboxylic acid compounds, such as tetrahydrophthalic acid, hexahydrophthalic acid, and methyltetrahydrophthalic acid, and derivatives thereof, such as acid anhydrides, acid halides, and alkyl esters of these compounds;
  aromatic dicarboxylic acid compounds, such as phthalic acid, isophthalic acid, and terephthalic acid, and derivatives thereof, such as acid anhydrides, acid halides, and alkyl esters of these compounds;
  tri- or more polyfunctional aliphatic polycarboxylic acid compounds, such as 1,2,5-hexanetricarboxylic acid, and derivatives thereof, such as acid anhydrides, acid halides, and alkyl esters of these compounds;
  tri- or more polyfunctional alicyclic polycarboxylic acid compounds, such as 1,2,4-cyclohexanetricarboxylic acid, and derivatives thereof, such as acid anhydrides, acid halides, and alkyl esters of these compounds; and
  tri- or more polyfunctional aromatic polycarboxylic acid compounds, such as trimellitic acid, trimellitic anhydride, 1,2,5-benzenetricarboxylic acid, and 2,5,7-naphthalenetricarboxylic acid, and derivatives thereof, such as acid anhydrides, acid halides, and alkyl esters of these compounds. These may be used individually or in combination.

Of these, in view of obtaining a curable composition advantageous not only in that a cured product obtained therefrom has high fracture toughness and high tensile strength, but also in that the composition exhibits excellent impregnation properties fora reinforcing fiber, preferred are bifunctional compounds, more preferred are the above-mentioned aliphatic dicarboxylic acid compounds and derivatives thereof, such as acid anhydrides, acid halides, and alkyl esters of the above compounds, and further especially preferred are the aliphatic dicarboxylic acid compounds having 4 to 10 carbon atoms and derivatives thereof, such as acid anhydrides, acid halides, and alkyl esters of the above compounds. When two or more types of the polybasic acid raw materials are used in combination, it is preferred that a bifunctional compound constitutes 80% by mass or more of the polybasic acid raw materials, it is more preferred that the above-mentioned aliphatic dicarboxylic acid compound or a derivative thereof, such as an acid anhydride, an acid halide, or an alkyl ester of the compound, constitutes 80% by mass or more of the polybasic acid raw materials, and further it is especially preferred that the aliphatic dicarboxylic acid compound having 4 to 10 carbon atoms or a derivative thereof, such as an acid anhydride, an acid halide, or an alkyl ester of the compound, constitutes 80% by mass or more of the polybasic acid raw materials.

Specific examples of the polyol raw materials include linear aliphatic diol compounds, such as ethylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol;
  aliphatic diol compounds having a branched chain, such as propylene glycol, 2-methyl-1,3-propanediol, neopentyl glycol, 2-ethyl-1,3-propanediol, 2-methyl-1,4-butanediol, 2-ethyl-2-methyl-1,3-propanediol, 2-ethylbutane-14-butanediol, 2,3-dimethyl-1,4-butanediol, 3-methyl-1,5-pentanediol, 2,4-dimethyl-1,5-pentanediol, 3,3-dimethylpentane-1,5-diol, 2,2-diethyl-1, 3-propanediol, 3-propylpentane-1,5-diol, 2,2-diethyl-1,4-butanediol, 2,4-diethyl-1,5-pentanediol, 2,2-dipropyl-1,3-propanediol, 2-ethyl-2-butyl-1,3-propanediol, and 2,5-diethyl-1,6-hexanediol;

alicyclic structure-containing diol compounds, such as cyclohexanediol and cyclohexanedimethanol;

aromatic ring-containing diol compounds, such as biphenol and bisphenol;

tri- or more polyfunctional aliphatic polyol compounds, such as trimethylolethane, trimethylolpropane, glycerol, hexanetriol, and pentaerythritol;

tri- or more polyfunctional aromatic polyol compounds, such as trihydroxybenzene;

polyether-modified polyol compounds obtained by ring-opening polymerization of the above-mentioned diol or tri- or more polyfunctional polyol compound and a cyclic ether compound, such as ethylene oxide, propylene oxide, tetrahydrofuran, ethyl glycidyl ether, propyl glycidyl ether, butyl glycidyl ether, phenyl glycidyl ether, or allyl glycidyl ether; and polycarbonate polyol. These may be used individually or in combination.

Of these, in view of obtaining a curable composition advantageous not only in that a cured product obtained therefrom has high fracture toughness and high tensile strength, but also in that the composition exhibits excellent impregnation properties for a reinforcing fiber, preferred are bifunctional compounds, more preferred are the above-mentioned aliphatic diol compounds, and further especially preferred are the linear aliphatic diol compounds having 2 to 8 carbon atoms. When two or more types of the polyol raw materials are used in combination, it is preferred that a bifunctional compound constitutes 80% by mass or more of the polyol raw materials, it is more preferred that the above-mentioned aliphatic diol compound constitutes 80% by mass or more of the polyol raw materials, and further it is especially preferred that the linear aliphatic diol compound having 2 to 8 carbon atoms constitutes 80% by mass or more of the polyol raw materials.

In view of obtaining a curable composition advantageous not only in that a cured product obtained therefrom has high fracture toughness and high tensile strength, but also in that the composition exhibits excellent impregnation properties for a reinforcing fiber, it is preferred that the polyester polyol (a2) is a polyester diol. Further, the polyester polyol (a2) preferably has a number average molecular weight (Mn) in the range of 500 to 4,000, more preferably in the range of 1,000 to 3,000. In the present invention, the number average molecular weight (Mn) of the polyester polyol (a2) is a value published by the manufacturer or a value measured by gel permeation chromatography (GPC) under the conditions shown below.

Measuring apparatus: HLC-8220GPC, manufactured by Tosoh Corp. Columns: Guard column "HXL-L", manufactured by Tosoh Corp.
+"TSK-GEL G2000HXL", manufactured by Tosoh Corp.
+"TSK-GEL G2000HXL", manufactured by Tosoh Corp.
+"TSK-GEL G3000HXL", manufactured by Tosoh Corp.
+"TSK-GEL G4000HXL", manufactured by Tosoh Corp.
Detector: RI (differential refractometer)
Conditions for measurement:
Column temperature: 40° C.
Solvent: THF
Flow rate: 1.0 ml/min Standard: Using a calibration curve prepared from polystyrene standard samples.
Sample: A 0.1% by mass THF solution, in terms of the amount of the resin solids, which has been subjected to filtration using a microfilter (sample amount per injection: 200 μl)

With respect to the hydroxyl group-containing epoxy resin (a3), there is no particular limitation as long as the resin has a hydroxyl group and a glycidyl group in the molecular structure thereof. Further, a single type of the hydroxyl group-containing epoxy resin (a3) may be individually used, or two or more types of the hydroxyl group-containing epoxy resins (a3) may be used in combination. Especially, in view of obtaining a curable composition advantageous not only in that a cured product obtained therefrom has high fracture toughness and high tensile strength, but also in that the composition exhibits excellent impregnation properties for a reinforcing fiber, preferred is a hydroxyl group-containing bifunctional epoxy resin obtained by glycidyl etherification of a diol compound.

The theoretical structure of the hydroxyl group-containing bifunctional epoxy resin can be represented by, for example, the following structural formula (2):

[Chem. 2]

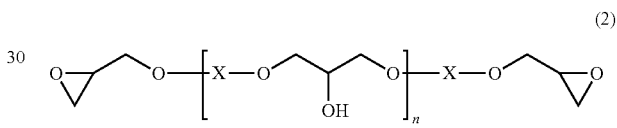

(2)

wherein X is a structure portion derived from a diol compound, n is 0 or an integer of 1 or more, and an average of n's is a value of more than 0.

Examples of the diol compounds include aliphatic diol compounds, such as ethylene glycol, propylene glycol, 1,3-propanediol, 2-methylpropanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentyl glycol, 1,6-hexanediol, 1,4-bis(hydroxymethyl)cyclohexane, and 2,2,4-trimethyl-1,3-pentanediol; and aromatic diol compounds, such as biphenol, tetramethylbiphenol, bisphenol A, bisphenol AP, bisphenol B, bisphenol BP, bisphenol C, bisphenol E, bisphenol F, and bisphenol S.

Of these, in view of obtaining a curable composition advantageous in that a cured product obtained therefrom has high fracture toughness and high tensile strength as well as excellent heat resistance and the like, a hydroxyl group-containing aromatic bifunctional epoxy resin obtained using the above-mentioned aromatic diol compound is preferably used. When two or more types of the hydroxyl group-containing epoxy resins (a3) are used in combination, the proportion of the mass of the hydroxyl group-containing aromatic bifunctional epoxy resin to the total mass of the hydroxyl group-containing epoxy resins (a3) is preferably 35% by mass or more, more preferably in the range of 40 to 90% by mass.

The hydroxyl group-containing epoxy resin (a3) preferably has an epoxy equivalent in the range of 100 to 400 g/equivalent, more preferably in the range of 100 to 250 g/equivalent. Further, the hydroxyl group-containing epoxy resin (a3) more preferably has a hydroxyl equivalent in the range of 600 to 3,500 g/equivalent.

In the present invention, the hydroxyl equivalent of the hydroxyl group-containing epoxy resin (a3) is a value measured by the method described below.

1. About 100 g of the hydroxyl group-containing epoxy resin (a3) and 25 mL of anhydrous dimethylformaldehyde were placed in a flask, and the resin was dissolved.
2. About 30 mg of dibutyltin laurate and 20 mL of an anhydrous toluene solution of phenyl isocyanate (1 mol/L) were added to the resultant solution, and the flask was dipped in a water bath at 50° C. and the resultant mixture was stirred for 60 minutes.
3. 20 mL of an anhydrous toluene solution of dibutylamine (2 mol/L) was added and the resultant mixture was stirred at room temperature for 30 minutes.
4. 30 mL of methyl cellosolve and 0.5 mL of a Bromocresol Green indicator were added, and the resultant mixture was subjected to titration using a methyl cellosolve solution of perchloric acid (1 mol/L). A blank measurement was also conducted.
5. A hydroxyl equivalent of the hydroxyl group-containing epoxy resin (a3) was calculated from the following formula.

(Hydroxyl equivalent (g/equivalent))=1,000×(Amount [g] of the sample of hydroxyl group-containing epoxy resin (a3))/[(Concentration [1 mol/L] of the methyl cellosolve solution of perchloric acid)×{(Titer [mL] of the solution of hydroxyl group-containing epoxy resin (a3))−(Titer [mL] of blank)}]

The urethane-modified epoxy resin (A) uses the above-mentioned polyisocyanate compound (a1), polyester polyol (a2), and hydroxyl group-containing epoxy resin (a3) as essential reaction raw materials, but an additional reaction raw material other than these raw materials may be further used. Examples of additional reaction raw materials include polyol compounds other than the above-mentioned polyester polyol (a2), such as an aliphatic polyol, an aromatic polyol, a polyether polyol, a polyolefin polyol, and a polycarbonate polyol. When an additional reaction raw material is used, in view of satisfactorily exhibiting effects of the present invention such that a cured product of the curable composition has excellent fracture toughness and excellent tensile strength, the proportion of the total mass of the polyisocyanate compound (a1), the polyester polyol (a2), and the hydroxyl group-containing epoxy resin (a3) to the total mass of the reaction raw materials for the urethane-modified epoxy resin (A) is preferably 70% by mass or more, more preferably 90% by mass or more.

With respect to the method for producing the urethane-modified epoxy resin (A), there is no particular limitation as long as the above-mentioned polyisocyanate compound (a1), polyester polyol (a2), and hydroxyl group-containing epoxy resin (a3) are used as essential reaction raw materials, and the urethane-modified epoxy resin (A) can be produced by any method. As examples of the method for producing the urethane-modified epoxy resin (A), there can be mentioned the following methods.

Method 1: a method in which all the reaction raw materials are charged at the same time and reacted with each other.

Method 2: a method in which the polyisocyanate compound (a1), the polyester polyol (a2), and an additional polyol compound optionally used are reacted with each other to obtain an isocyanate group-containing intermediate, and then the hydroxyl group-containing epoxy resin (a3) is reacted with the intermediate.

Method 3: a method in which the polyisocyanate compound (a1) and the hydroxyl group-containing epoxy resin (a3) are reacted with each other to obtain an isocyanate group-containing intermediate, and then the polyester polyol (a2) and an additional polyol compound optionally used are reacted with the intermediate.

Method 4: a method in which the polyisocyanate compound (a1), part of or all of the polyester polyol (a2), part of or all of the hydroxyl group-containing epoxy resin (a3), and part of or all of an additional polyol compound optionally used are reacted with each other to obtain an isocyanate group-containing intermediate, and then the rest of the polyester polyol (a2), the hydroxyl group-containing epoxy resin (a3), and the additional polyol compound is reacted with the intermediate.

In any of the methods 1 to 4 above, in view of obtaining the curable composition having excellent storage stability and the like, the molar ratio of the isocyanate group and the hydroxyl group in the reaction raw materials [(NCO)/(OH)] is preferably in the range of 1/0.95 to 1/5.0.

Further, in view of exhibiting more remarkable effects such that a cured product of the curable composition has excellent fracture toughness and excellent tensile strength, the proportion of the mass of the polyester polyol (a2) to the total mass of the reaction raw materials is preferably in the range of 5 to 50% by mass, more preferably in the range of 15 to 35% by mass.

In view of obtaining a curable composition advantageous not only in that a cured product obtained therefrom has high fracture toughness and high tensile strength, but also in that the composition exhibits excellent curing properties and excellent impregnation properties fora reinforcing fiber, the urethane-modified epoxy resin (A) preferably has an epoxy equivalent in the range of 150 to 300 g/equivalent.

The main material in the curable composition of the invention may contain an additional component, in addition to the urethane-modified epoxy resin (A). As examples of additional components, there can be mentioned additional epoxy resins other than the urethane-modified epoxy resin (A).

Examples of the additional epoxy resins include diglycidyloxybenzene, diglycidyloxynaphthalene, an aliphatic epoxy resin, a biphenyl epoxy resin, a bisphenol epoxy resin, a novolak epoxy resin, a triphenolmethane epoxy resin, a tetraphenolethane epoxy resin, a phenol- or naphthol aralkyl epoxy resin, a phenylene- or naphthylene ether epoxy resin, a dicyclopentadiene-phenol addition reaction product epoxy resin, a phenolic hydroxyl group-containing compound-alkoxy group-containing aromatic compound copolycondensation epoxy resin, a glycidylamine epoxy resin, and naphthalene skeleton-containing epoxy resins other than these resins.

With respect to the aliphatic epoxy resin, for example, there can be mentioned glycidyl etherification products of various aliphatic polyol compounds. A single type of the aliphatic epoxy resin may be individually used, or two or more types of the aliphatic epoxy resins may be used in combination. Examples of the aliphatic polyol compounds include aliphatic diol compounds, such as ethylene glycol, propylene glycol, 1,3-propanediol, 2-methylpropanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentyl glycol, 1,6-hexanediol, 1,4-bis(hydroxymethyl) cyclohexane, and 2,2,4-trimethyl-1,3-pentanediol; and tri- or more polyfunctional aliphatic polyol compounds, such as trimethylolethane, trimethylolpropane, glycerol, hexanetriol, pentaerythritol, ditrimethylolpropane, and dipentaerythritol.

With respect to the biphenol epoxy resin, for example, there can be mentioned epoxy resins obtained by polyglycidyl etherification of a biphenol compound, such as biphenol or tetramethylbiphenol, using an epihalohydrin. Of these, preferred are those having an epoxy equivalent in the range of 150 to 200 g/eq.

With respect to the bisphenol epoxy resin, for example, there can be mentioned epoxy resins obtained by polyglycidyl etherification of a bisphenol compound, such as bisphenol A, bisphenol F, or bisphenol S, using an epihalohydrin. Of these, preferred are those having an epoxy equivalent in the range of 158 to 200 g/eq.

With respect to the novolak epoxy resin, for example, there can be mentioned epoxy resins obtained by polyglycidyl etherification, using an epihalohydrin, of a novolak resin formed from one phenol compound or two or more phenol compounds, such as phenol, cresol, naphthol, bisphenol, or biphenol.

With respect to the triphenolmethane epoxy resin, for example, there can be mentioned epoxy resins having a structure portion represented by the following structural formula (3) as repeating structure units.

[Chem. 3]

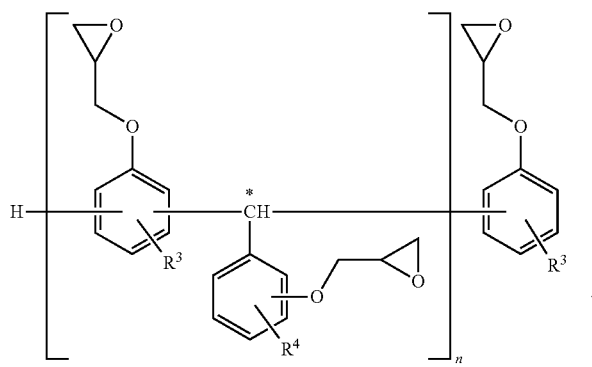

(3)

In the formula, each of $R^3$ and $R^4$ is independently a hydrogen atom or a bonding site for linking the structure portion represented by the structural formula (3) through a methine group indicated by symbol *, and n is an integer of 1 or more.

With respect to the phenol- or naphthol aralkyl epoxy resin, for example, there can be mentioned epoxy resins having a molecular structure in which a glycidyloxybenzene or glycidyloxynaphthalene structure is bonded through a structure portion represented by any one of the following structural formulae (4-1) to (4-3).

[Chem. 4]

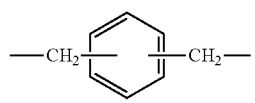

(4-1)

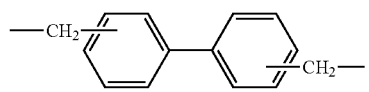

(4-2)

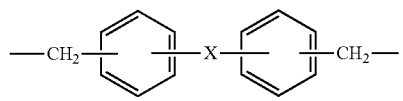

(4-3)

In the formula, X is an alkylene group having 2 to 6 carbon atoms, an ether linkage, a carbonyl group, a carbonyloxy group, a sulfide group, or a sulfonic group.

With respect to the naphthalene skeleton-containing epoxy resin, for example, there can be mentioned epoxy compounds represented by any one of the following structural formulae (5-1) to (5-3).

[Chem. 5]

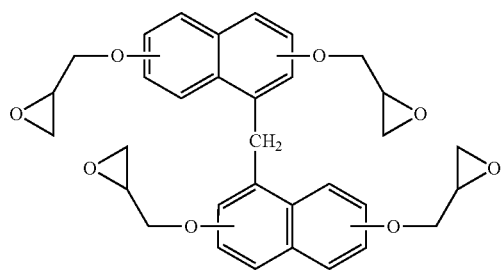

(5-1)

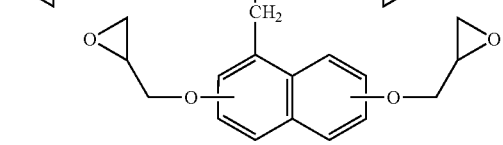

(5-2)

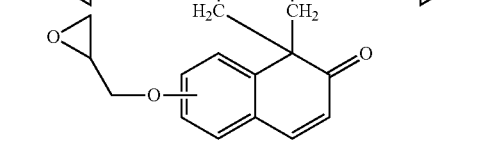

(5-3)

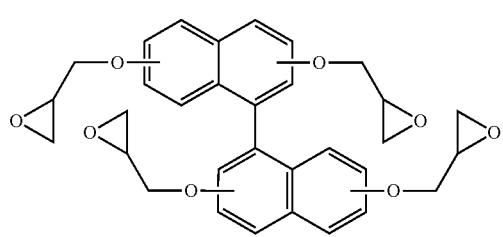

Among the above-mentioned additional epoxy resins, in view of obtaining a curable composition advantageous not only in that a cured product obtained therefrom has high fracture toughness and high tensile strength, but also in that the composition exhibits excellent impregnation properties for a reinforcing fiber, preferred is an aliphatic epoxy resin, a bisphenol epoxy resin, a triphenolmethane epoxy resin, a glycidylamine epoxy resin, or a naphthalene skeleton-containing epoxy resin, more preferred is an aliphatic epoxy resin or a bisphenol epoxy resin, and especially preferred is an aliphatic epoxy resin.

The amount of each epoxy resin contained in the main material is not particularly limited, and can be appropriately controlled according to the desired performance, the use and the like. It is more preferred that the proportion of the mass of the urethane-modified epoxy resin (A) to the total mass of the epoxy resin component is in the range of 30 to 100% by mass. When an aliphatic epoxy resin is used as the additional epoxy resin, the mass ratio of the epoxy resins [urethane-modified epoxy resin (A)/aliphatic epoxy resin] is preferably in the range of 30/70 to 100/0.

The curing agent in the curable composition of the invention contains an acid anhydride (B) as an essential component. A single type of the acid anhydride (B) may be individually used, or two or more types of the acid anhydrides (B) may be used in combination. Specific examples of acid anhydrides (B) include tetrahydrophthalic anhydride, methyltetrahydrophthalic anhydride, hexahydrophthalic anhydride, methylhexahydrophthalic anhydride, methyl-endo-ethylenetetrahydrophthalic anhydride, a trialkyltetrahydrophthalic anhydride, methyl nadic anhydride, phthalic anhydride, trimellitic anhydride, pyromellitic anhydride, and maleic anhydride.

In the present invention, an additional curing agent or curing accelerator (B') may be used in combination with the acid anhydride (B). With respect to the additional curing agent or curing accelerator (B'), one which is generally used as a curing accelerator for an epoxy resin and an acid anhydride can be used in the present invention, and specific examples of such curing agents or curing accelerators include an imidazole derivative, a tertiary amine, an amine complex salt, an amide compound, a phenolic hydroxyl group-containing compound or phenolic resin, a phosphorus compound, a urea derivative, an organic acid metal salt, and a Lewis acid.

In the curable composition of the invention, with respect to the ratio of the amounts of the main material and curing agent incorporated is not particularly limited, and can be appropriately controlled according to the desired performance of the cured product and the use. As an example of the amounts of the main material and curing agent incorporated, it is preferred that, relative to 1 mol of the epoxy group of the epoxy resin component in the main material, the total of the acid anhydride group of the acid anhydride (B) in the curing agent is in the range of 0.5 to 1.05 mol.

Further, when the additional curing agent or curing accelerator (B') is used, the amount of the additional curing agent or curing accelerator incorporated is not particularly limited, and can be appropriately controlled according to the desired performance of the cured product and the use. Especially, it is preferred that the additional curing agent or curing accelerator (B') is incorporated into the curable composition in an amount of 0.1 to 30% by mass. The additional curing agent or curing accelerator (B') may be blended with the curing agent, together with the acid anhydride (B), or may be added when blending the main material and the curing agent.

The curable composition of the invention may contain an additional resin component or various types of additives in one of or both of the main material and the curing agent. Examples of the additional resin components include an acid-modified polybutadiene, a polyether sulfone resin, a polycarbonate resin, and a polyphenylene ether resin.

With respect to the acid-modified polybutadiene, there can be mentioned an acid-modified polybutadiene obtained by modifying polybutadiene with an unsaturated carboxylic acid. Further, as a commercially available acid-modified polybutadiene, for example, there can be used maleic anhydride-modified liquid polybutadiene, manufactured by Evonik Degussa GmbH (such as polyvest MA75 and Polyvest EP MA120), maleic anhydride-modified polyisoprene, manufactured by Kuraray Co., Ltd. (LIR-403, LIR-410), and the like.

With respect to the polycarbonate resin, for example, there can be mentioned a polycondensation product of a dihydric or bifunctional phenol and a carbonyl halide, and a product obtained by subjecting a dihydric or bifunctional phenol and a carbonic diester to polymerization by a transesterification method. Further, the polycarbonate resin may have a molecular structure of the polymer chain thereof, which is a linear structure, or may have a branched structure in the molecular structure.

The polyphenylene ether resin may be a modified polyphenylene ether resin which has introduced into the resin structure thereof a reactive functional group, such as a carboxyl group, an epoxy group, an amino group, a mercapto group, a silyl group, a hydroxyl group, or a dicarboxyl anhydride group, by a method, such as a graft reaction or copolymerization.

Examples of the above-mentioned various types of additives include a flame retardant or flame retardant auxiliary, a filler, the other additives, and an organic solvent. Examples of the flame retardants or flame retardant auxiliaries include a phosphorus flame retardant, a nitrogen flame retardant, a silicone flame retardant, a metal hydroxide, a metal oxide, a metal carbonate compound, a metallic powder, a boron compound, low melting-point glass, ferrocene, an acetylacetonato metal complex, an organometal carbonyl compound, an organocobalt salt compound, an organosulfonic acid metal salt, and a compound having a metal atom and an aromatic compound or a heterocyclic compound which are ionically bonded or coordinately bonded to each other. These may be used individually or in combination.

Examples of the fillers include titanium oxide, glass beads, a glass flake, a glass fiber, calcium carbonate, barium carbonate, calcium sulfate, barium sulfate, potassium titanate, aluminum borate, magnesium borate, fused silica, crystalline silica, alumina, silicon nitride, aluminum hydroxide, fibrous reinforcing materials, such as a kenaf fiber, a carbon fiber, an alumina fiber, and a quartz fiber, and non-fibrous reinforcing materials. These may be used individually or in combination. Further, these fillers may be coated with an organic material, an inorganic material, or the like.

Further, when a glass fiber is used as a filler, the glass fiber can be selected from roving of a continuous fiber type, a chopped strand of a short fiber type, a milled fiber, and the like. It is preferred to use the glass fiber which has been surface-treated for the resin used in the composition. By incorporating a filler into the composition, a non-combustible layer (or carbide layer) formed upon combustion can be further improved in strength. The non-combustible layer (or carbide layer) formed upon combustion is unlikely to be broken, enabling the resultant material to exhibit stable heat insulation ability, so that a larger flame retardancy effect can be obtained. Further, it is possible to impart high rigidity to the material.

Examples of the other additives include a plasticizer, an antioxidant, an ultraviolet light absorber, stabilizers, such as a light stabilizer, an antistatic agent, a conductivity imparting agent, a stress relaxation agent, a release agent, a crystallization promoter, a hydrolysis suppressing agent, a lubricant, an impact imparting agent, a sliding property improving agent, a compatibilizing agent, a nucleating agent, a reinforcement, a reinforcing material, a flow modifier, a dye, a sensitizer, a coloring pigment, a rubber polymer, a thickener, an anti-settling agent, an anti-sagging agent, an anti-foaming agent, a coupling agent, a rust preventive agent, an anti-fungus or mildewproofing agent, a stainproofing agent, and a conductive polymer.

The above-mentioned organic solvent is advantageously used when, for example, a fiber-reinforced resin molded article is produced using the curable composition of the invention by a filament winding method. With respect to the type and amount of the organic solvent added, there is no particular limitation, and they are appropriately selected according to the dissolving power of the solvent for the compounds contained in the curable composition of the invention, the operation properties in the molding step, and the like. Examples of the organic solvents include methyl ethyl ketone acetone, dimethylformamide, methyl isobutyl ketone, methoxypropanol, cyclohexanone, methyl cellosolve, ethyl diglycol acetate, and propylene glycol monomethyl ether acetate.

The curable composition of the invention can be used in various applications, such as a coating composition, electric and electronic materials, a bonding agent, and a molded article. The curable composition of the invention can be advantageously used not only in such an application that the curable composition itself is cured, but also in a fiber-reinforced composite material, a fiber-reinforced resin molded article and the like.

The method for obtaining a cured product from the curable composition of the invention may be conducted in accordance with a general curing method for an epoxy resin composition, and, for example, heating temperature conditions may be appropriately selected according to the type of the curing agent used in combination with the curable composition, and the use of the cured product, and the like. For example, there can be mentioned a method in which the curable composition is heated at a temperature in the range of room temperature to about 250° C. With respect to the molding method and the like, a general method for a curable composition can be used, and conditions characteristic of the curable composition of the invention are not particularly needed.

The fiber-reinforced composite material of the present invention is a material having a reinforcing fiber impregnated with the curable composition which is in a state before being cured. The reinforcing fiber used in the fiber-reinforced composite material may be any of a twisted yarn, an untwisted yarn, a non-twisted yarn, and the like, but is preferably an untwisted yarn or a non-twisted yarn because such a fiber has excellent formability in the fiber-reinforced composite material. Further, with respect to the form of the reinforcing fiber, a reinforcing fiber obtained by unidirectionally arranging the fiber, or woven fabric of a reinforcing fiber can be used. The woven fabric can be arbitrarily selected from plain weave, satin weave, and the like according to the part in which the resultant composite material is used or the use of the composite material. Specifically, as examples of reinforcing fibers having excellent mechanical strength and durability, there can be mentioned a carbon fiber, a glass fiber, an aramid fiber, a boron fiber, an alumina fiber, and a silicon carbide fiber, and two or more types of these fibers can be used in combination. Of these, especially, in view of obtaining a molded article having excellent strength, a carbon fiber is preferred, and, with respect to the carbon fiber, those of various types, such as a polyacrylonitrile, pitch, or rayon type, can be used.

With respect to the method for obtaining a fiber-reinforced composite material from the curable composition of the invention, there is no particular limitation, but, for example, there can be mentioned a method in which the components constituting the curable composition are uniformly mixed with each other to prepare a varnish, and then a unidirectional reinforcing fiber obtained by unidirectionally arranging a reinforcing fiber is immersed in the obtained varnish (in a state before being cured in a pultrusion method or a filament winding method), and a method in which woven fabric of a reinforcing fiber is set in a female mold so that the woven fabric is stacked on one another, and then the mold is closely sealed with a male mold and a resin is injected so as to subject the fabric to pressure impregnation with the resin (in a state before being cured in an RTM method).

With respect to the carbon fiber, there is no particular limitation, but, from the viewpoint of the mechanical strength and rigidity, preferred is a carbon fiber having a tensile strength in the range of 3,000 to 7,000 MPa, a tensile elongation in the range of 1.5 to 2.3%, and a tensile modulus of 200 MPa or more. Further, more preferred is a carbon fiber having a tensile strength in the range of 4,500 to 6,500 MPa, a tensile elongation in the range of 1.7 to 2.3%, and a tensile modulus of 230 MPa or more. Examples of commercially available carbon fiber products include "TORAYCA (registered trademark)" T800S-24000, "TORAYCA (registered trademark)" T700SC-12000, "TORAYCA (registered trademark)" T700SC-24000, and "TORAYCA (registered trademark)" T300-3000.

Further, with respect to the carbon fiber bundle, it is preferred that the number of filaments per fiber bundle is in the range of 3,000 to 5,0000. When the number of filaments is less than 3,000, the fiber is likely to be bent, causing the strength to be poor. Conversely, when the number of filaments is 50,000 or more, impregnation of the composite material containing such a fiber with the resin is likely to be a failure, and therefore it is more preferred that the number of filaments is 5,000 to 40,000.

Further, in the fiber-reinforced composite material of the invention, the volume content of the reinforcing fiber in the whole volume of the fiber-reinforced composite material is preferably 40 to 85%, and, from the viewpoint of the strength, the volume content is further preferably in the range of 50 to 70%. When the volume content of the reinforcing fiber is less than 40%, it is likely that the amount of the curable composition contained in the composite material is so large that the resultant cured product has only unsatisfactory flame retardancy, or it is impossible to satisfy the properties required for the fiber-reinforced composite material having excellent specific modulus and specific strength. Further, when the volume content of the reinforcing fiber is more than 85%, it is likely that the adhesion between the reinforcing fiber and the resin composition becomes poor.

The fiber-reinforced resin molded article of the invention is a molded article having a reinforcing fiber and a cured product of the curable composition, and is obtained by heat-curing a fiber-reinforced composite material. With respect to the fiber-reinforced resin molded article of the invention, specifically, the volume content of the reinforcing fiber in the fiber-reinforced molded article is preferably in the range of 40 to 85%, and, from the viewpoint of the strength, the volume content is especially preferably in the range of 50 to 70%. Examples of such fiber-reinforced resin molded articles include parts for an automobile, such as a front sub-frame, a rear sub-frame, a front pillar, a center pillar, a side member, a cross member, a side sill, a roof rail, and a propeller shaft, a core member for wires and cables, pipe materials for submarine oil fields, roll and pipe materials for printers, robot fork materials, and primary structural materials and secondary structural materials for aircrafts.

With respect to the method for obtaining a fiber-reinforced molded article from the curable composition of the invention, there is no particular limitation, but a pultrusion method, a filament winding method, an RTM method, or the like is preferably used. The pultrusion method is a method in which a fiber-reinforced composite material is introduced into a mold and cured by heating, and then drawn out of the mold using a pultrusion apparatus to form a fiber-reinforced resin molded article, the filament winding method is a method in which a fiber-reinforced composite material (containing a unidirectional fiber) is wound round an aluminum liner, a plastic liner, or the like while rotating the liner, and then cured by heating to form a fiber-reinforced resin molded article, and the RTM method is a method in which, using two types of molds, i.e., a female mold and a male mold, a fiber-reinforced composite material within the molds is cured by heating to form a fiber-reinforced resin molded article. When forming a fiber-reinforced resin molded article of a large product size or of a complicated shape, an RTM method is preferably used.

With respect to the molding conditions for a fiber-reinforced resin molded article, molding is conducted by heat-curing the fiber-reinforced composite material preferably at a temperature in the range of 50 to 250° C., more preferably at a temperature in the range of 70 to 220° C. When the molding temperature is too low, it is likely that satisfactory fast-curing properties cannot be obtained, and conversely, when the molding temperature is too high, it is likely that thermal strain causes the molded article to suffer warpage. With respect to the other molding conditions, there can be mentioned a method in which the fiber-reinforced composite material is cured in two stages, for example, the fiber-reinforced composite material is precured at 50 to 100° C. to obtain a tack-free cured product, and then the cured product is subjected to further treatment under conditions at a temperature of 120 to 200° C.

As further examples of the method for obtaining a fiber-reinforced molded article from the curable composition of the invention, there can be mentioned a hand lay-up method and a spray-up method in which fiber aggregate is placed on the bottom of a mold and the above-mentioned varnish and fiber aggregate are laid on one another so that multiple layers are formed, a vacuum bag method in which, using any one of a male mold and a female mold, a substrate formed from a reinforcing fiber is stacked on one another while impregnating the substrate with a varnish, and molded, and covered with a flexible mold capable of applying a pressure to the molded material, and the resultant airtight-sealed material is subjected to vacuum forming, and an SMC pressing method in which a varnish containing a reinforcing fiber, which has been preliminarily in a sheet form, is subjected to compression molding using a mold.

EXAMPLES

Hereinbelow, the present invention will be described in more detail with reference to the following Examples and Comparative Example, and, in the following Examples and Comparative Example, "part (s)" and "%" are given by mass unless otherwise specified.

Production Example 1: Production of a Urethane-Modified Epoxy Resin (A-1)

29 parts by mass of isophorone diisocyanate was charged into a four-neck flask equipped with a nitrogen gas introducing pipe, a cooling pipe, a thermometer, and a stirrer, and heated to 80° C. Subsequently, 161 parts by mass of a polyester diol (obtained from ethylene glycol and adipic acid as reaction raw materials; hydroxyl value: 55 mg KOH/g; number average molecular weight (Mn): 2,000) was added to the isophorone diisocyanate in the flask. Then, 0.1 parts by mass of a urethane-forming reaction catalyst ("NEOSTANN U-28", manufactured by Nitto Kasei Co., Ltd.) was added, and the resultant mixture was subjected to reaction for 2 hours to obtain an intermediate (1) having an isocyanate group content of 2.1% by mass.

Then, 342 parts by mass of a bisphenol A epoxy resin ("EPICLON 850-S", manufactured by DIC Corporation; epoxy equivalent: 188 g/equivalent; hydroxyl equivalent: 2,900 g/equivalent) was added to the intermediate, and the resultant mixture was subjected to reaction under conditions at a temperature of 80° C. before ensuring that the isocyanate group disappeared, obtaining a urethane-modified epoxy resin (A-1). The urethane-modified epoxy resin (A-1) had an epoxy equivalent of 293 g/equivalent.

Production Example 2: Production of a Urethane-Modified Epoxy Resin (A-2)

23 parts by mass of tolylene diisocyanate was charged into a four-neck flask equipped with a nitrogen gas introducing pipe, a cooling pipe, a thermometer, and a stirrer, and heated to 80° C. Subsequently, 156 parts by mass of a polyester diol (obtained from ethylene glycol and adipic acid as reaction raw materials; hydroxyl value: 55 mg KOH/g; number average molecular weight (Mn): 2,000) was added to the tolylene diisocyanate in the flask. Then, 0.1 parts by mass of a urethane-forming reaction catalyst ("NEOSTANN U-28", manufactured by Nitto Kasei Co., Ltd.) was added, and the resultant mixture was subjected to reaction for 2 hours to obtain an intermediate (2) having an isocyanate group content of 1.8% by mass.

Then, 341 parts by mass of a bisphenol A epoxy resin ("EPICLON 850-S", manufactured by DIC Corporation; epoxy equivalent: 188 g/equivalent; hydroxyl equivalent: 2,900 g/equivalent) was added to the intermediate, and the resultant mixture was subjected to reaction under conditions at a temperature of 80° C. before ensuring that the isocyanate group disappeared, obtaining a urethane-modified epoxy resin (A-2). The urethane-modified epoxy resin (A-2) had an epoxy equivalent of 287 g/equivalent.

Production Example 3: Production of a Urethane-Modified Epoxy Resin (A-3)

24 parts by mass of tolylene diisocyanate was charged into a four-neck flask equipped with a nitrogen gas introducing pipe, a cooling pipe, a thermometer, and a stirrer, and heated to 80° C. Subsequently, 88.8 parts by mass of a 1,4-butanediol epoxy resin ("Denacol EX-214", manufactured by Nagase Chemtex Corporation; epoxy equivalent: 137 g/equivalent; hydroxyl equivalent: 1,460 g/equivalent) and 165 parts by mass of a polyester diol (obtained from ethylene glycol and adipic acid as reaction raw materials; hydroxyl value: 55 mg KOH/g; number average molecular weight (Mn): 2,000) were added to the tolylene diisocyanate in the flask. Then, 0.1 parts by mass of a urethane-forming reaction catalyst ("NEOSTANN U-28", manufactured by Nitto Kasei Co., Ltd.) was added, and the resultant mixture was subjected to reaction for 2 hours to obtain an intermediate (3) having an isocyanate group content of 0.8% by mass.

Then, 543 parts by mass of a bisphenol A epoxy resin ("EPICLON 850-S", manufactured by DIC Corporation; epoxy equivalent: 188 g/equivalent; hydroxyl equivalent:

2,900 g/equivalent) was added to the intermediate, and the resultant mixture was subjected to reaction under conditions at a temperature of 80° C. before ensuring that the isocyanate group disappeared, obtaining a urethane-modified epoxy resin (A-3). The urethane-modified epoxy resin (A-3) had an epoxy equivalent of 202 g/equivalent.

Production Example 4: Production of a Urethane-Modified Epoxy Resin (A-4)

23 parts by mass of tolylene diisocyanate was charged into a four-neck flask equipped with a nitrogen gas introducing pipe, a cooling pipe, a thermometer, and a stirrer, and heated to 80° C. Subsequently, 159 parts by mass of a polyester diol (obtained from hexamethylene glycol and adipic acid as reaction raw materials; hydroxyl value: 55 mg KOH/g; number average molecular weight (Mn): 2,000) was added to the tolylene diisocyanate in the flask. Then, 0.1 parts by mass of a urethane-forming reaction catalyst ("NEOSTANN U-28", manufactured by Nitto Kasei Co., Ltd.) was added, and the resultant mixture was subjected to reaction for 2 hours to obtain an intermediate (4) having an isocyanate group content of 1.8% by mass.

Then, 317 parts by mass of a bisphenol A epoxy resin ("EPICLON 850-S", manufactured by DIC Corporation; epoxy equivalent: 188 g/equivalent; hydroxyl equivalent: 2,900 g/equivalent) was added to the intermediate, and the resultant mixture was subjected to reaction under conditions at a temperature of 80° C. before ensuring that the isocyanate group disappeared, obtaining a urethane-modified epoxy resin (A-4). The urethane-modified epoxy resin (A-4) had an epoxy equivalent of 285 g/equivalent.

Production Example 5: Production of a Urethane-Modified Epoxy Resin (A-5)

29 parts by mass of isophorone diisocyanate was charged into a four-neck flask equipped with a nitrogen gas introducing pipe, a cooling pipe, a thermometer, and a stirrer, and heated to 80° C. Subsequently, 161 parts by mass of a polyester diol (obtained from ethylene glycol and adipic acid as reaction raw materials; hydroxyl value: 55 mg KOH/g; number average molecular weight (Mn): 2,000) was added to the isophorone diisocyanate in the flask. Then, 0.1 parts by mass of a urethane-forming reaction catalyst ("NEOSTANN U-28", manufactured by Nitto Kasei Co., Ltd.) was added, and the resultant mixture was subjected to reaction for 2 hours to obtain an intermediate (1) having an isocyanate group content of 2.0% by mass.

Then, 342 parts by mass of a bisphenol A epoxy resin ("EPICLON 850-S", manufactured by DIC Corporation; epoxy equivalent: 188 g/equivalent; hydroxyl equivalent: 2,900 g/equivalent), 188 parts by mass of a 1,4-butanediol epoxy resin ("Denacol EX-214", manufactured by Nagase Chemtex Corporation; epoxy equivalent: 137 g/equivalent; hydroxyl equivalent: 1,460 g/equivalent), and 280 parts by mass of a trimethylolpropane epoxy resin ("Denacol EX-321", manufactured by Nagase Chemtex Corporation; epoxy equivalent: 140 g/equivalent; hydroxyl equivalent: 695 g/equivalent) were added to the intermediate, and the resultant mixture was subjected to reaction under conditions at a temperature of 80° C. before ensuring that the isocyanate group disappeared, obtaining a urethane-modified epoxy resin (A-5). The urethane-modified epoxy resin (A-5) had an epoxy equivalent of 190 g/equivalent.

Examples 1 to 5 and Comparative Example 1

The components were mixed according to the formulation shown in Table 1 below, and uniformly stirred to obtain a curable composition. With respect to the obtained curable composition, evaluation tests were conducted according to the procedures described below. The results are shown in Table 1.

Details of the components used in the Examples and Comparative Example are as follows.

Aliphatic polyol epoxy resin (C-1): "Denacol EX-214", manufactured by Nagase Chemtex Corporation; 1,4-butanediol epoxy resin; epoxy equivalent: 137 g/equivalent Aliphatic polyol epoxy resin (C-2): "Denacol EX-321", manufactured by Nagase Chemtex Corporation; trimethylolpropane epoxy resin; epoxy group equivalent: 140 g/equivalent Bisphenol A epoxy resin: "EPICLON 850-S", manufactured by DIC Corporation; epoxy equivalent: 188 g/equivalent Acid anhydride (B-1): Methyltetrahydrophthalic anhydride ("EPICLON B-570-H", manufactured by DIC Corporation)

Curing accelerator: N,N-Dimethylbenzylamine

Test for Tensile Strength

Using a filament winding apparatus, a carbon fiber ("T700SC-12,000", manufactured by Toray Industries Inc.) was impregnated with a curable composition while winding the fiber, and the resultant carbon fiber was cured by heating at 120° C. for 2 hours and then at 140° C. for 2 hours to obtain a fiber-reinforced resin molded article having a fiber volume content (Vf) of 60% and a thickness of 2 mm. The obtained plate of the molded article was cut and subjected to tensile test in accordance with JIS K7161.

Measurement of a Fracture Toughness

A curable composition was cast into a frame having a size of 200 mm×100 mm×6 mm, and cured by heating at 120° C. for 2 hours and then at 140° C. for 2 hours to obtain a cured product. With respect to the obtained cured product, a Kic value was measured in accordance with ASTM D 5045.

TABLE 1

| Curable composition | | Example 1 | Example 2 | Example 3 | Example 4 | Example 5 | Comparative Example 1 |
|---|---|---|---|---|---|---|---|
| Urethane-modified epoxy resin (A-1) | Part(s) by mass | 28 | | | | | |
| Urethane-modified epoxy resin (A-2) | | | 27 | | | | |
| Urethane-modified epoxy resin (A-3) | | | | 27 | | | |
| Urethane-modified epoxy resin (A-4) | | | | | 26 | | |
| Urethane-modified epoxy resin (A-5) | | | | | | | 53 |

TABLE 1-continued

| Curable composition | Example 1 | Example 2 | Example 3 | Example 4 | Example 5 | Comparative Example 1 |
|---|---|---|---|---|---|---|
| Aliphatic polyol epoxy resin (C-1) | 10 | 10 | | | | |
| Aliphatic polyol epoxy resin (C-2) | 15 | 15 | 22 | 28 | | |
| Bisphenol A epoxy resin | | | | | | 53 |
| Acid anhydride (B-1) | 47 | 48 | 51 | 46 | 47 | 47 |
| Curing accelerator | 1 | 1 | 1 | 1 | 1 | 1 |
| Tensile strength [MPa] | 2,500 | 2,300 | 2,300 | 2,300 | 2,400 | 1,970 |
| Fracture toughness ($K_{IC}$) [MPa · m$^{1/2}$] | 1.49 | 1.4 | 1.5 | 1.48 | 1.52 | 0.55 |

The invention claimed is:

1. A method for producing a fiber-reinforced resin molded article, the method comprising heat-curing a fiber-reinforced composite material;
    wherein the fiber-reinforced composite material comprises a curable composition and a reinforcing fiber as essential components;
        wherein the curable composition is a curable composition comprising a urethane-modified epoxy resin (A) as an essential component of a main material, and an acid anhydride (B) as an essential component of a curing agent, wherein the urethane-modified epoxy resin (A) is a reaction product of a polyisocyanate compound (a1), a polyester polyol (a2), and a hydroxyl group-containing aromatic bifunctional epoxy resin (a3) as essential reaction raw, and wherein the polyisocyanate compound (a1) and the hydroxyl group-containing epoxy resin (a3) are reacted with each other to obtain an isocyanate group-containing intermediate, and then the polyester polyol (a2) and an optional additional polyol compound used are reacted with the intermediate;
        wherein the epoxy equivalent of the urethane-modified epoxy resin (A) is 150 to 300 g/equivalent; and
        wherein the polyester polyol (a2) is a polyester diol having a number average molecular weight (Mn) of 500 to 4,000.

2. The method for producing a fiber-reinforced resin molded article according to claim 1, wherein a linear aliphatic diol compound having 2 to 8 carbon atoms constitutes 80% by mass or more of a polyol raw material for the polyester polyol (a2).

3. The method for producing a fiber-reinforced resin molded article according to claim 1, wherein the polyisocyanate compound (a1) has an isocyanate group content of 35% by mass or more.

4. The method for producing a fiber-reinforced resin molded article according to claim 1, wherein the proportion of the mass of the urethane-modified epoxy resin (A) to the total mass of the urethane-modified epoxy resin (A) and additional epoxy resins other than the urethane-modified epoxy resin (A) contained in the main material is in the range of 30 to 100% by mass.

5. The method for producing a fiber-reinforced resin molded article according to claim 1, wherein the main material contains an aliphatic epoxy resin, in addition to the urethane-modified epoxy resin (A).

6. The method for producing a fiber-reinforced resin molded article according to claim 5, wherein the mass ratio of the urethane-modified epoxy resin (A) and the aliphatic epoxy resin [urethane-modified epoxy resin (A)/aliphatic epoxy resin] is in the range of 30/70 to 100/0.

7. The method for producing a fiber-reinforced resin molded article according to claim 1,
    wherein the molar ratio of the isocyanate group and the hydroxyl group in the reaction raw materials [(NCO)/(OH)] is in the range of 1/0.95 to 1/5.0.

8. The method for producing a fiber-reinforced resin molded article according to claim 1,
    wherein the proportion of the mass of the polyester polyol (a2) to the total mass of the reaction raw materials is in the range of 5 to 50% by mass.

9. The method for producing a fiber-reinforced resin molded article according to claim 8,
    wherein the proportion of the mass of the polyester polyol (a2) to the total mass of the reaction raw materials is in the range of 15 to 35% by mass.

10. A fiber-reinforced composite material produced by the method of claim 1.

* * * * *